United States Patent [19]

Wilmes

[11] Patent Number: 4,645,673

[45] Date of Patent: Feb. 24, 1987

[54] FROZEN PIZZA WITH LOW FAT PASTRY CRUST

[75] Inventor: John H. Wilmes, Carpentersville, Ill.

[73] Assignee: The Quaker Oats Company, Chicago, Ill.

[21] Appl. No.: 787,899

[22] Filed: Oct. 16, 1985

[51] Int. Cl.$^4$ ............................................. A21D 13/00
[52] U.S. Cl. .................................... 426/94; 426/289; 426/302; 426/502
[58] Field of Search .................. 426/94, 502, 302, 289

[56] References Cited

U.S. PATENT DOCUMENTS

| | | | |
|---|---|---|---|
| 3,329,141 | 4/1968 | Groth | 426/502 |
| 3,388,997 | 6/1968 | Schaible et al. | 426/502 |
| 3,879,564 | 4/1975 | Cocozzella | 426/94 |
| 4,283,424 | 8/1981 | Bone | 426/94 |
| 4,283,431 | 8/1981 | Giordano et al. | 426/94 |
| 4,303,677 | 12/1981 | De Acetis | 426/502 |
| 4,308,286 | 12/1981 | Anstett et al. | 426/502 |

*Primary Examiner*—Jeanette Hunter
*Attorney, Agent, or Firm*—J. P. O'Halloran

[57] ABSTRACT

Frozen pizza product with special baked pastry shell is produced from a dough comprising a specified mixture of high protein and low protein wheat flours, and containing between 10 and 17% by weight of solid fat pieces, preferably flakes, of specified dimensions, wherein the fat pieces have a melting point in the range 118°–128° F. by the Wiley method, and wherein the mixing takes place so that the solid fat pieces remain as such as the dough goes into the oven for baking.

After topping with pizza sauce and freezing, the resulting crust is tender in the inside and crisp on the bottom, after final rebaking by the consumer, even after freeze-thaw cycles which sometimes occur during shipping and storage.

2 Claims, No Drawings

FROZEN PIZZA WITH LOW FAT PASTRY CRUST

It is not enough to produce crusts that are tender when baked before topping and freezing. Crust for frozen pizza should also be tender in the middle and crisp at the bottom when baked after freezing. Moreover, highly successful pizza products must have good physical characteristics such as tenderness and crispness even after baking after the product has been through freeze-thaw cycles which ordinarily occur during storage and shipping.

It has been suggested in U.S. Pat. No. 3,379,141, which issued to Groth, to make a baked pizza crust using bread doughs in a pressure stamping method which substantially homogenizes the ingredients in the dough. Groth referred to the need to dehydrate the resulting products along with the baking to prepare them for storage in an untopped condition. Groth made no claim that the product of that process would be suitable for use for frozen storage after topping with pizza sauce and subsequent rebaking. In fact we have found that the Groth method results in tough unsuitable crust if frozen after topping, and rebaked, a problem which is exacerbated if any freeze-thaw cycle occurred during the frozen storage time.

On the other hand, there are numerous patents that call for the deep fat frying of dough intended for frozen pizza crust Typically, such products end up with 15–25% fat in the crust. However, these crusts, in fact, result in a product that is not tender in the middle or crisp on the bottom upon rebaking after a frozen storage period, especially with some freeze-thaw cycles during storage. In addition to giving a crust with a perceptably greasy exterior, such crusts have a tendency of wicking the sauce through the interiors during freeze-thaw cycles resulting in a cardboard-like character when finally rebaked.

It would be highly desirable to provide a method for making a frozen pizza crust which does not involve the deep fat frying and which uses conventional baking equipment and yet is suitable for high speed commercial production.

On the other hand, it is known that the baked dough products generally referred to as pastry dough products normally contain between about 25% to well over 50% fat, most of which are over 40% fat. Nonetheless it would be highly desirable to provide a pastry-type pizza crust suitable for use in topped and frozen pizza products. We discovered that merely lowering the pastry fat level gives a topped frozen pizza crust product which is unsatisfactory from the point of view of poor freeze-thaw stability, and then toughness after final rebaking by the consumer.

It is an object of the present invention to provide a unique combination of formulation and processing conditions which result in the manufacture of a baked frozen topped pizza crust with surprisingly exceptional qualities such as tender interiors and crisp bottoms upon baking, even after freeze-thaw cycles.

These and other objects which will be apparent hereinafter are accomplished in accordance with the unique formulation and method of the present invention.

In accordance with the present invention, a dough is prepared using a special combination of wheat flour ingredients, in an otherwise bread-like formulation, and immediatly after the dough is prepared, between 10% and 17% by weight, based on the weight of all the ingredients, of high melting point solid fat pieces is minimally admixed therewith merely to disperse the fat pieces in the dough. The resulting dough has small visible fat pieces dispersed throughout. Such pieces are readily visible in torn cross sections, if the fat pieces have color.

The resulting dough is formed into any desired shape, for example into a disc, either by pressing the dough into a sheet and cutting discs therefrom, or by stamping balls of the dough into a disc shape.

In a preferred method the dough is stamped, and in a highly efficient industrial operation the dough is stamped twice to assure absolute dimensional uniformity of the product.

After the dough discs are formed, in accordance with the general procedures outlined above, the discs are docked, baked, and cooled. (The elements such as pans, for conveying the dough through the oven are also cooled for re-cycling through the above described process.) Any desired aqueous or other topping is then added to the cooled baked crust, such as for example, pizza topping, and the assembly is frozen and packaged. Such products are typically, at a later date, placed into a baking oven for a relatively short period of time during which the product is thawed completely and "baked" for a second time.

SPECIFIC DISCUSSION OF THE INVENTION

In accordance with the present invention, the flour mixture which is used in the preparation of the dough includes hard wheat flour having a protein content between 11 and 13% (based on the weight of the flour ingredient, and a soft wheat, pastry flour (having a protein content between 7.5% and 10.0% by weight based on the weight of the flour and more preferably between 8 and 9% protein. The first and second flours are present in a ratio in the range from 75-25 to 25-75, inclusive. Preferred ratios are in the range between 60/40 and 40/60, inclusive, of the hard to soft wheat; a most preferred mixture contains equal quantities of hard and soft wheat flour.

In a most preferred embodiment, conventional amounts of salt, sugar, yeast, and other conditioners are also used, as desired, in making the dough in accordance with the present invention. A typical formulation is shown hereinafter in Table 1.

TABLE 1

| Ingredient | A<br>Ingredient<br>Weight<br>%*[1] | B<br>Range<br>% |
|---|---|---|
| Wheat flour, hard spring | 27.7 | 75–25%*[2] |
| Pastry flour, winter wheat | 27.7 | 25–75%*[2] |
| Salt | 0.5 | As desired |
| Sugar | 1.1 | As desired |
| Yeast | 2.2 | As desired |
| Calcium Propronate | 0.07 | As desired |
| Dough conditioner P-244 Foremost Foods | 1.0 | As desired |
| Shortening, vegetable oil | 1.1 | As desired |
| Kristel Gold II Shortening Durkee Foods | 11.1 | 10–17%[1] |
| Water | 16.9 | As desired |

*[1]Based on the weight of all the ingredients
*[2]Based on the weight of the flour The conditioners can include agents such as calcium propronate, as well as other conditioners and relaxers such as cystine relaxers.

Although very small amounts of shortening can be used, e.g. less than 3%, it is preferable that no shortening be used in the making of the initial dough. After the dough is mixed and most of the kneading has taken place, high melting point solid fat pieces are dispersed in the dough in an amount sufficient to provide between about 10 and 17% of the high melting point fat, based on the entire weight of the ingredients, including water.

The high melting point fat pieces used in accordance with the present invention, are solid fat pieces having a Wiley melting point in the range 118°-130° F., more preferably in the range from about 120°-127° F. and most preferably in the range 121°-125° F.

Fats having lower melting points, when tested in the otherwise identical process of the present invention, result in products which do not have good interior tenderness, lightness, or crispy bottoms, and which have poor freeze-thaw stability. When fats having higher melting points are used the resulting product have an undesirable waxey mouth feel even though the other post rebaking physical characteristics may be suitable.

The high melting point fat is added as small solid pieces, preferably in flaked form having thicknesses between 0.01 and 0.1". The preferred pieces have face sizes with random dimensions ranging from 0.1 to 1.0". Preferably the pieces are flakes between 0.01 and 0.03" thick and have face dimensions randomly ranging from 0.1 to 1.0". However, it is not necessary that the fat pieces include pieces with dimensions in the entire stated range, and, for example, a mass of solid flakes with face dimensions of about 0.25 inches is eminently useful in accordance with this invention.

Solid fats used in accordance with this invention are typically made of partially hydrogenated soy bean oil, and typically contain auxilliary edible ingredients such as lecitin, artificial flavors, and artificial colors, and can be Kosher if properly processed. An example of a commercially available fat which is suitable for use in accordance with this invention is a product sold commercially as "Kristel Gold" (registered trademark of Durkee, a Division of S.C.M Durkee Industrial Foods).

When this final admixing takes place properly, although some of the smallest pieces may be "lost" in the dough, it is nonetheless apparent that solid pieces of fat remain interspersed, as such, throughout the dough.

After the dough is mixed and the solid fat pieces are admixed therein, it is subjected to conventional dough processing steps such as resting, dividing, and shaping.

The preferred method of shaping in accordance with the present invention is stamping in which a ball of the dough of suitable weight is stamped by a heated piston against a cold plate or pan. A dough ball of about 220 grams can be used for a pizza shell of 11-12 inches, and about 95 grams for a shell of about 8 inches, for example. When the product is formed into balls, the dough balls are preferably allowed to pass quickly through a falling curtain of liquid oil so that about 2 or 3 grams of liquid oil per 90-250 grams of dough are applied. Also the pans are lightly oiled with a liquid edible oil. This facilitates the stamping step referred to hereinafter. The reference to vegetable oil in Table 1 refers to the relatively small amounts of oil incorporated as set forth above, i.e. applied to the exterior surface of the dough.

Because stamping equipment is so well known, specific drawings and description is believed to be unnecessary. Sufficient to say, conventional equipment such as that described in U.S. Pat. No. 3,379,141 to Groth is eminently satisfactory for use in this invention, and the specification and drawings of that patent are incorporated herein by reference thereto. However, when used in accordance with the present invention, unlike the process described in the Groth patent, the pressing does not result in a homogenization of the ingredients, but the flaky character of the fat in the dough is retained.

In a high speed industrial operation in which absolutely uniform shape and dimension are important, a first and second stamping is preferably employed. The plate or pan cavities into which the dough is stamped should be cooled to a temperature below about 90° F., preferably to a temperature no greater than about 80°-85° F. There is sufficient resilence in the dough after the first stamping so that after a few moments of resting, the dough may revert by pulling in, resulting in a slightly distorted or out-of-round crust after the baking step, if a second pressing is not employed.

The press can be operated with the head at ambient temperature, but it is preferred that the head, i.e. the shaping punch face contacting the dough be at least warmed above the melting point of the solid fat pieces.

For maximum uniformity, a double pressing results in substantially perfectly shaped dough discs after the baking step. In preferred embodiments, the press heads should have the capability of being heated to at least a temperature in the range of about 130°-160° F., and the more preferred operating temperature is in the range 135-145, most preferrably at about 140° F. In accordance with this invention, the press heads are preferably heated to a temperature between about 130° F. and 180° F., but the pressing time should not be long enough to heat the dough mass sufficiently to melt the solid fat and/or cause it to be incorporated into the dough, with the loss of its integrity as a solid piece. We have found that when the punch face is at temperatures above 180° F., it is virtually impossible to punch the dough quickly enough to avoid loss of the integrity of the solid fat pieces; thus the use of punch face temperatures below 160° F. are preferred, and those in the range 135°-145° F. inclusive, are more preferred. Heat on the press heads improve the dough flow characteristics, enhances the press-out and eliminates buildup of fat flakes on the punch face. Also, without the heating, the dough would tend to stick to the punch face and this would result in consequent distortion of the crust as the press head retracts. Also, through the use of heated punches the problem of crust cupping has been substantially eliminated. The use of warm punches improves the dough flow characteristics and eliminates the unevenness in crust thickness after baking. When pressing the pastry dough, the first stamp should result in filling the pan cavity with dough substantially completely. Illustrative typical press conditions to provide this are pressures in the range of 800-1400 psi, pressures in the range 900-1300 psi absolute being preferred. Exemplary dwell times of about 1-2 seconds are adequate. These conditions are particularly applicable when the pans are cold (less than 80°-85° F.) and the punches are warm (130° minimum, preferably 140° F.). A good press-out in the first stamp reduces the amount of pressing required at the second stamp. Performing the second stamping with an unheated head would result in sticking or flashing. An exemplary and typical dwell time and pressure used for the second stamp are about 1 second at 1100 psi. When the dough is pressed out and completely fills the cavity in the second stamp, no dough pull-back or distortion in the oven is observed. Nonetheless pressure, temperature, dwell time in the stamping step can be adjusted or flexed to get the desired spread or shaping of the dough to accomodate periodic fluctuation in the characteristics of the ingredients used in the formulation, which result in differences in resilence of the dough that is subjected to the stamping step.

The discs, or other dough shapes produced in the process of the present invention, are preferably docked, i.e. subjected to compression in a device containing a large number of needlle-like or tiny finger-like projections which perforate or substantially perforate the discs at numerous points for the release of steam generated during baking.

In accordance with a preferred embodiment the present invention, the docked dough pieces are baked under conditions necessary to provide a complete bake, and the process of the present invention lends itself to a high speed commercial process in which the product is completely baked at 4 to 5 minutes at about 600° F. for example.

Such baking results in a product having about 25% moisture, and with no raw dough. The baking process in accordance with this invention results in the creation of a crust with a very flaky character which is tender and open. The many points within the dough at which the fat particles were located result in relatively large cavities which appear to be opened by steam within the dough during baking. The fat appears to "wick" into the surrounding crumb during baking. Upon cooling, the fat appears to seal these internal cavities. It is believed that these many sealed cavities result in the formation of many internal barriers against the penetration of the sauce liquids into and through the pizza crust during the topping, freeze-thaw cycles, and final rebaking, with the achievement of tender interior and crisp bottoms upon the final rebaking step by the consumer.

The crust product coming from the oven is then preferably cooled at least to room temperature and it is topped by application of a suitable topping to the surface thereof and then the assembled composite is frozen.

However, when used in accordance with the present invention, unlike the process described in the Groth patent, the pressing does not result in a homogenization of the ingredients, but the flaky character of the fat in the dough is retained as the dough proceeds into the oven.

Preferred embodiments of the present invention are described hereinafter in the following Examples. These Examples are not for the purpose of limiting the invention but merely for the purpose of illustrating preferred aspects of the invention.

EXAMPLE 1

Ingredients in the amounts set forth in Column A of Table 1 are admixed as follows: Yeast, sugar, calcium proponate and cystine relaxer are weighed and dumped into a mixer along with the water. The mix is admixed with water at slow speed and allowed to ferment for approximately 5 minutes. The pastry flour and hard wheat flour are added to the fermented mixture and allowed to be thoroughly mixed, and finally, the salt and the vegetable oil if desired are added.

The dough is first mixed at slow speeds and then at high speeds for about 4 minutes. When the mixing and kneading in the dough mixer is substantially complete, Kristel Gold (T.M. Durkee) fat flakes at a temperature of 35°-45° F. are added. The fat flakes have a Wiley Melting Point of 121°-125° F. The fat flakes are approximately 0.02" thick and have a face random dimension ranging from 0.1 to 1". The fat flakes are added at the very end of the mixing step in order to maintain flake integrity. The desirable open, large elongated cell structure in the pastry crust is dependent upon the maintaining of the flakes substantially as such when the flakes are dispersed in the dough.

In a preferred embodiment, a minimal amount of release oil (any non-emulsified liquid edible oil) is thereafter added to the mixture to assist in release the dough from the mixer into the trough. The dough is allowed to rest for about 5 minutes, it is divided into the appropriate weight balls (for example 220 grams for larger pizzas and 95 grams for smaller pizzas). The individual dough balls are allowed to move quickly transversely through a falling curtain of liquid fat so as to apply a small amount, e.g. about 3 grams of liquid fat to the surface of each ball. The separate rounded pieces are then allowed to proof at about 95°-110° F.

The proofed dough balls are then placed on pans (which have been previously cooled to a temperature below 80° F.) and the dough balls are subjected to a press-out with this step's punch pressure being at 1100 psi with the punch die temperature being 140° F. The dwell time during the pressing was about 1½ seconds. A press such as that described in U.S. Pat. No. 3,379,141 can be used in the illustration of this example.

The pressed-out dough was permitted to relax for a few minutes, with the pan being maintained at a temperature below about 80° F., during which time the inherent resiliency of the dough caused the circumferencial edges, in places, to withdraw slightly from the full circular dimension of the shaping pan.

The rested dough disc is then pressed a second time for approximately 1½ seconds at 1000 psi with the pan at temperature at less than 80° F. and the press die being at about 140° F. The resulting discs were then docked by pressing into each disc a conventional docking device containing a large number of tiny rigid fingers which substantially penetrate the disc.

The resulting docked disc is baked for 4 minutes at 600° F. The solid fat pieces are present, as such, at the beginning of baking, and, while I don't want to be bound by any theories, it is my belief based on repeated observation that the presence of the solid fat piece at some location in the dough causes a loss of continuity, or a pore, to occur at that location point, and continued baking causes the fat to melt and "wick" into the dough surrounding the pore. Upon cooling after baking, the walls of the pores are sealed by the solid fat against the passage of aqueous liquids. The resulting baked pizza shells separate easily from the pans after this baking step, and they are found to be completely baked and edible and have a moisture level of about 25%. Breaking or tearing the resulting baked crust shows that it has a multitude of open pores in the locations where the flakes of fat had been located, and a light tender flaky interior.

The baked crusts are then cooled preferably to a temperature below ambient temperatures and any desired pizza topping is applied. The nature of the topping constitutes no part of the present invention, and any aqueous based pizza topping, for example, or other edible topping material can be used in accordance with the method of the present invention.

The resulting assembled product is frozen in a conventional manner, and is packaged and stored.

On rebaking of this frozen product, the crust is found to have a tender interior, and a crisp tender bottom, as well.

EXAMPLE 2

The procedure of Example 1 is repeated and the frozen product is subjected to 3 freeze-thaw cycles prior to final baking by the consumer. The resulting baked product is found to have a tender interior, and a delightful tender but crisp bottom, with no substantial intrusion of liquids from the pizza topping into the interior of the crust.

EXAMPLE 3

This Example is not in accordance with this invention but is provided to illustrate the results achieved when the flour mixture employed is not in accordance with the method of this invention.

The procedure of Example 1 is repeated except that in two separate tests a respective dough sample is made of 100% hard wheat flour, and another respective dough sample is made with 100% pastry flour. After being baked, topped, frozen and rebaked, neither of these products had the tender interiors, and the crisp bottoms, and the pizza crusts were tough after topping, freezing and rebaking. The toughness got worse on other respective pizzas made by both the procedures of Example 2 after several freeze-thaw cycles.

EXAMPLE 4

This Example is also not in accordance with this invention but is provided to illustrate the result obtained when the solid fat is not used in a level in accordance with this invention.

The procedure of Example 1 was repeated except that the high melting point fat was added in an amount of about 6% based on the weight of the ingredients. This product resulted in a tough pizza crust after final baking, and the toughness increased when other pizzas produced in the process of this Example were subjected to 2 or 3 freeze-thaw cycles.

EXAMPLE 5

This Example is not in accordance with this invention but is provided to illustrate the result obtained when the solid fats are not used in a level in accordance with this invention.

The procedure of Example 1 was repeated in two additional tests, except that the high melting point fat was added in an amount of 20% and 30%, respectively. The resulting product did not produce as tender a crust as that in accordance with the present invention, but also caused the sensation of fat coating the mouth giving a waxey mouth feel, in each respective test.

I claim:

1. A method of making a frozen pizza product comprising preparing a leavened dough containing a flour mixture comprising a mixture of first and second flours having a ratio of said first and second flours in the range 75:25 to 25:75, in which said first flour has a protein content between 11 and 13% and the second flour has a protein content between 7.5% and 10% by weight based on the weight of the flour, and kneading said dough; admixing with said dough solid fat pieces in an amount between 10 and 17% by weight based on the weight of all of the ingredients, said solid fat pieces having a melting point in the range 118°–130° F., and being in the form of flakes having a thickness in the range 0.01 to 0.3", and having a face dimension in the range 0.1 to 1.0", said admixing being sufficient to randomly disperse the solid fat pieces into the dough, but not sufficient for the fat pieces to lose their identity as solid fat pieces, shaping the dough into a desired pizza crust shape, baking said shell, applying pizza sauce to the upper face of said shell, and freezing the resulting pizza.

2. The method of claim 1 in which said solid fat is in the form of flakes having a thickness of about 0.02", and in which the fat is used in an amount of between 10 and 13% by weight based on the weight of all of the ingredients, and in which said fat has a Wiley melting point in the range of 121°–124° F.

* * * * *